(No Model.)
J. TASCHER.
PHOTOGRAPHIC CAMERA.
No. 525,238. Patented Aug. 28, 1894.
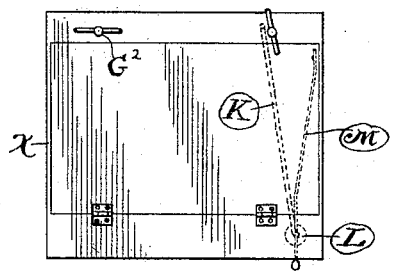
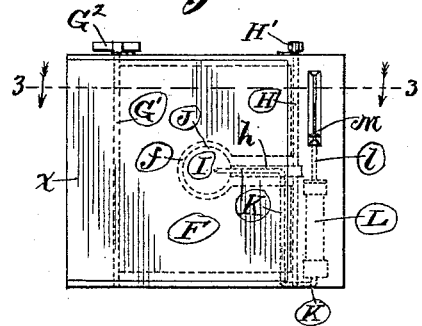
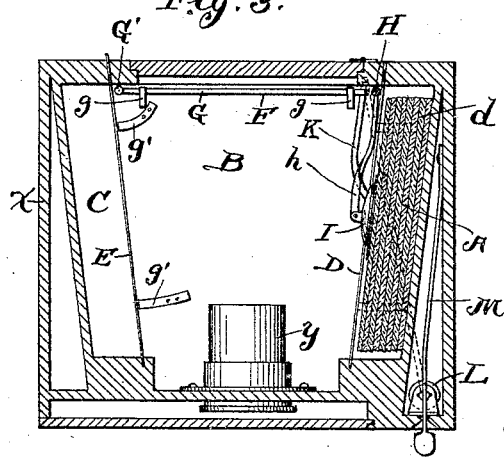
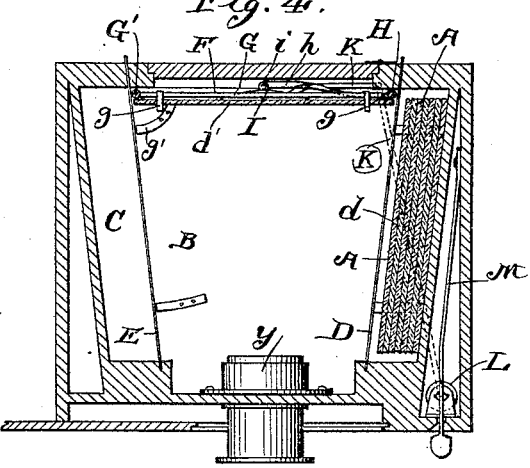
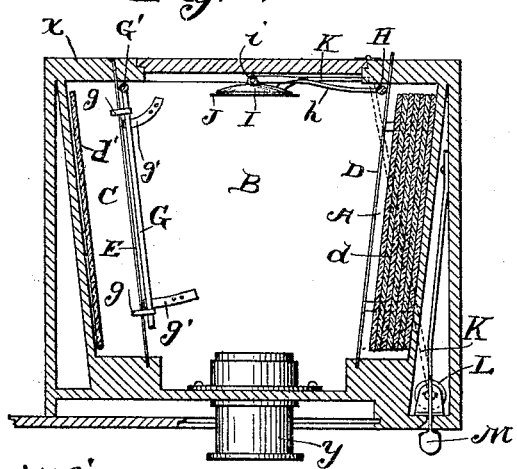
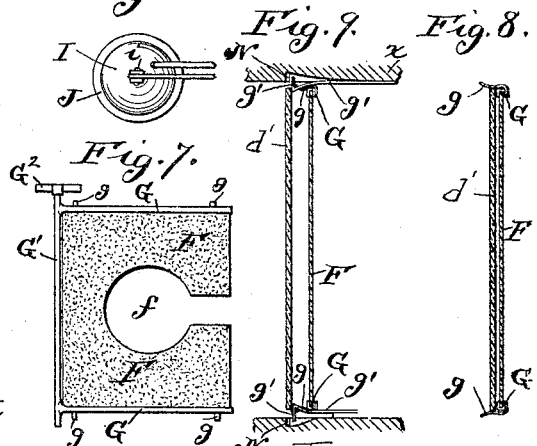
Witnesses:
R. J. Jaekes,
Flora L. Brown.
Inventor:
John Tascher,
By Charles Turner Brown,
Atty.

UNITED STATES PATENT OFFICE.

JOHN TASCHER, OF CHICAGO, ILLINOIS.

PHOTOGRAPHIC CAMERA.

SPECIFICATION forming part of Letters Patent No. 525,238, dated August 28, 1894.

Application filed September 30, 1893. Serial No. 486,866. (No model.)

*To all whom it may concern:*

Be it known that I, JOHN TASCHER, a resident of the city of Chicago, in the county of Cook and State of Illinois, have invented certain new and useful Improvements in Photographic Cameras, of which the following, when taken in connection with the drawings accompanying and forming a part hereof, is a full and complete description, sufficient to enable those skilled in the art to understand, make, and use the same.

My invention relates to photographic cameras of the kind wherein means are provided within the camera for placing properly sensitized plates therein and also mechanism for bringing such plates, in rotation, into position to be exposed to the lens of the camera, and after exposure into position to be properly preserved until it is desired to remove such exposed plates from the camera.

The object of my invention is to provide a photographic camera of the character named with mechanism whereby the ordinary glass plates, properly sensitized, can be stored within the camera, one of such plates taken from the receptacle therefor and moved into position for exposure, and after exposure conveyed to a second receptacle and there stored; both of such receptacles being light proof while the plate in position is exposed.

To accomplish my purpose I have embodied my invention in the herein illustrated and described mechanisms; and in the drawings referred to—

Figure 1 is a top plan view of a photographic camera containing such mechanisms; Fig. 2 a rear elevation thereof; Fig. 3 a sectional view on line 3—3 of Fig. 2, viewed in the direction indicated by the arrows: the camera being closed; Fig. 4 a like sectional view as Fig. 3, with the camera open and the sensitized plates differently disposed, however, and with one of such plates in position for exposure; Fig. 5 a like sectional view, with the camera open, and with the plate which in Fig. 4 is in position for exposure, deposited in the receptacle provided therefor; Fig. 6 a rear elevation of a part of the pneumatic device forming a part of the constructions embodying the inventions; Fig. 7 a rear elevation of the focusing glass of the camera; and the frame inclosing it and forming the conveyer by means of which the sensitized plate is taken from the position for exposure as illustrated in Fig. 4 and carried to and deposited in the receptacle therefor, as illustrated in Fig. 5; Fig. 8 a vertical sectional view of the focusing glass and frame illustrated in elevation in Fig. 7, with a sensitized plate in such frame and Fig. 9 a vertical sectional view of such focusing glass, frame and sensitized plate, with the sensitized plate just taken from the frame (and conveyer) and with means for effecting such removal of the plate from the frame shown in side elevation.

The same letter of reference is employed to designate a part where more than one view thereof is illustrated in the several figures of the drawings.

X is the camera box and $y$ the lens tube thereof.

A is the storage receptacle for unexposed sensitized plates, B the exposing chamber and C the storage receptacle for exposed plates.

D is an ordinary slide separating, when closed, the storage receptacle for unexposed plates from the exposing chamber.

$d$, $d$, are unexposed sensitized plates and $d'$, (Fig. 5) is an exposed sensitized plate.

F is the focusing screen, constructed of ground glass, oiled paper or other suitable material.

$f$ is an aperture in focusing glass F made to permit a pneumatic holder, hereinafter described, to pass through it.

G is the frame of focusing glass F.

$g$, $g$, are spring catches on frame G adapted to grasp a sensitized plate $d$, when properly presented thereto, and whereby frame G is adapted to act as a conveyer.

$g'$, $g'$, are spring catches attached to the camera box X and adapted to engage with the plate $d'$ held in frame and conveyer G between such plate and frame and thereby disengage such plate from such frame and conveyer and cause the plate to be deposited in storage receptacle C when the plate is properly presented thereto, as by the pivotal movement of the frame and conveyer, on its pivot or vertical shaft G'.

$G^2$ is a handle attached to the vertical shaft G' of frame or conveyer G by means of which such frame or conveyer is actuated.

H is a vertical shaft carrying arm $h$ and I is a concave disk pivotally attached by pin $i$ to arm $h$.

J is a rubber disk attached to concave disk I.

K is a rubber pipe extending from the concave side of disk I and rubber J to air exhauster L.

$l$ is the piston rod of air exhauster L. Piston-rod $l$ is attached to handle M so that upward and downward movement of the handle produces corresponding movement in the piston.

N are the grooves or ways in which slides D E move, respectively.

The operation of the device embodying my invention is: Properly sensitized unexposed plates are put in the storage receptacle therefor, and the slides to both storage receptacles closed. The object to be photographed is then focused on the focusing screen: after which the slide to the lens is closed. The slide to the storage receptacle for the unexposed plates is then opened, and the vertical shaft H, carrying arm $h$, and pneumatic holder I, J, is then moved so as to bring the pneumatic holder in contact with the clear or unsensitized side of the plate next to the exposing chamber, in the storage receptacle and the air exhausted from between the pneumatic holder and sensitized plate by means of the air exhauster. The handle of the air exhauster being held in proper position to maintain the vacuum or partial vacuum between the pneumatic holder and the sensitized plate the vertical shaft H, arm $h$ and the pneumatic holder are by handle O, moved, thereby carrying the sensitized plate, so that the sensitized plate is brought in front of the focusing screen and into engagement with clasps or spring catches $g\,g$ on frame G. The handle of the air exhauster is then released and the hold of the pneumatic holder on the sensitized plate thereby relinquished. The slide between the exposing chamber and the storage receptacle for unsensitized plates is then closed. An exposure is then made in the ordinary way, and the lens slide closed. The slide between the storage receptacle for exposed sensitized plates and the exposing chamber is then opened and frame G, by means of handle $G^2$, moved so that the exposed plate is taken to the storage receptacle therefor; at which point the spring catches $g'\,g'$ engage with such plate and the frame being moved back to its initial position the plate is retained in the storage receptacle therefor and the slide is closed.

The above described operation is repeated until the storage receptacle for unexposed sensitized plates is exhausted of its contents and the storage receptacle for exposed sensitized plates correspondingly filled when such chamber is emptied of its contents and the camera again charged with fresh plates.

Having thus described my invention, what I claim, and desire to secure by Letters Patent, is—

1. In a photographic camera, the combination of a concave disk inside the camera, a flexible covering on the concave face of the disk, a handle outside the camera controlling the position of the disk, a passageway for air extending from the face of the flexible covering of the concave disk to outside the exposing chamber, and an air exhauster outside the exposing chamber to which the air passageway extends; substantially as described.

2. The combination in a photographic camera, of an exposing chamber, a dark chamber, a removable partition between the exposing and the dark chamber, a concave disk within the exposing chamber, a flexible covering on the concave face of the disk, mechanism outside the exposing chamber connected to the disk whereby the position of the disk is controlled, an air passage way extending from the under side of the flexible covering of the concave disk to outside the exposing chamber and means outside of the exposing chamber connecting with the air passage way for exhausting air from between the flexible covering of the disk and a photographic sensitized plate when the disk is in contact therewith, and for supplying air thereto; substantially as described.

3. In a photographic camera the combination of an exposing chamber, dark chambers, removable partitions between the exposing chamber and the respective dark chambers, a concave disk within the exposing chamber, a flexible covering on the face of the disk, mechanism outside the camera connected to the disk whereby the position of the disk is controlled, clasps within the camera adapted to remain therein sensitized photographic plates while an exposure thereof is made, an air passage way extending from the concave face of the flexible covering of the disk to outside the exposing chamber and means outside of the exposing chamber for exhausting air through the air passage way from between the flexible covering of the disk and the sensitized plate when the disk is in contact therewith, and for supplying air thereto; substantially as described.

4. In a photographic camera, the combination of an exposing chamber, dark chambers, means for separating the respective dark chambers from the exposing chamber, a concave disk within the exposing chamber, a flexible covering on the concave face of the disk, a passageway for air from the face of the flexible covering of the concave disk to outside the exposing chamber, an air exhauster outside the camera communicating with the air passageway, mechanism outside the camera connected to the disk whereby the position of such disk is controlled, and a focusing screen having an opening therein adapted to permit the passage therethrough of the concave disk, substantially as described.

JOHN TASCHER.

Witnesses:
CHARLES TURNER BROWN,
HUGO C. H. KRAUSE.